United States Patent [19]

Dingess

[11] 4,073,507
[45] Feb. 14, 1978

[54] CAR COUPLING

[75] Inventor: Billy Dingess, Ferrellsburg, W. Va.

[73] Assignee: Lester Construction Co., Hurricane, W. Va.

[21] Appl. No.: 736,772

[22] Filed: Oct. 28, 1976

[51] Int. Cl.$^2$ ............................................. B60D 1/14
[52] U.S. Cl. ............................... 280/477; 280/478 B; 280/487
[58] Field of Search ............. 280/446 B, 477, 478 R, 280/478 B, 483, 484, 485, 487

[56] References Cited

U.S. PATENT DOCUMENTS

| | | | |
|---|---|---|---|
| 2,189,170 | 2/1940 | Gaussoin | 280/487 X |
| 2,671,673 | 3/1954 | Benson | 280/477 |
| 2,804,315 | 8/1957 | Guye | 280/488 |
| 2,826,432 | 3/1958 | Clever | 280/477 |
| 3,744,819 | 7/1973 | Cook | 280/477 |

FOREIGN PATENT DOCUMENTS 931,212  7/1955  Germany ............................ 280/477

*Primary Examiner*—Joseph F. Peters, Jr.
*Assistant Examiner*—R. Schrecengost
*Attorney, Agent, or Firm*—Gipple & Hale

[57] ABSTRACT

A mine car coupling device is described which comprises a coupling pin assembly pivotally mounted so that a pin is automatically engaged into the aperture of an elongated ring shaped receiving member or tongue. The housing has sloped front guide surfaces and curved inner side walls that align the coupling receiving member or tongue in both horizontal and vertical orientation so that the pin will be affirmatively engaged in position. The coupling receiving member permits horizontal and vertical variation of the tongue member through the use of compressible rubber springs.

11 Claims, 3 Drawing Figures

U.S. Patent  Feb. 14, 1978  Sheet 2 of 2  4,073,507
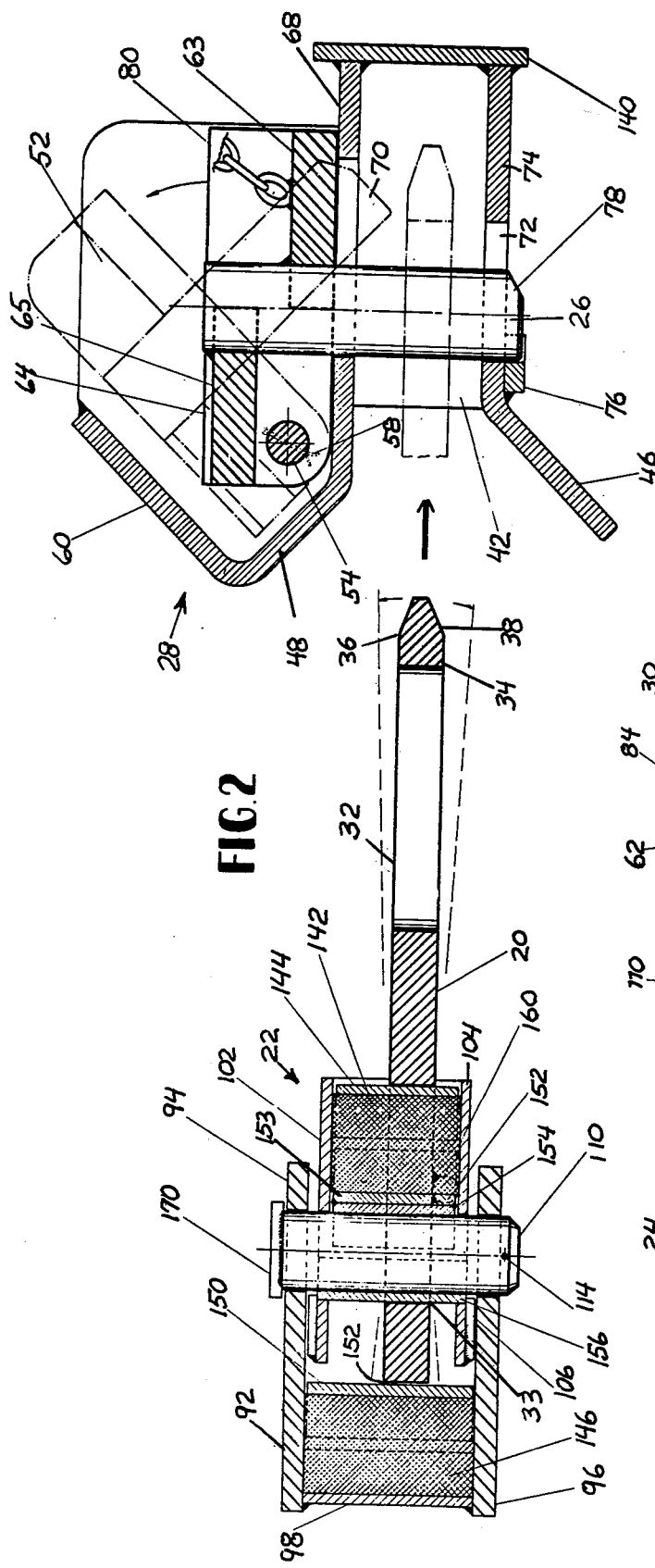
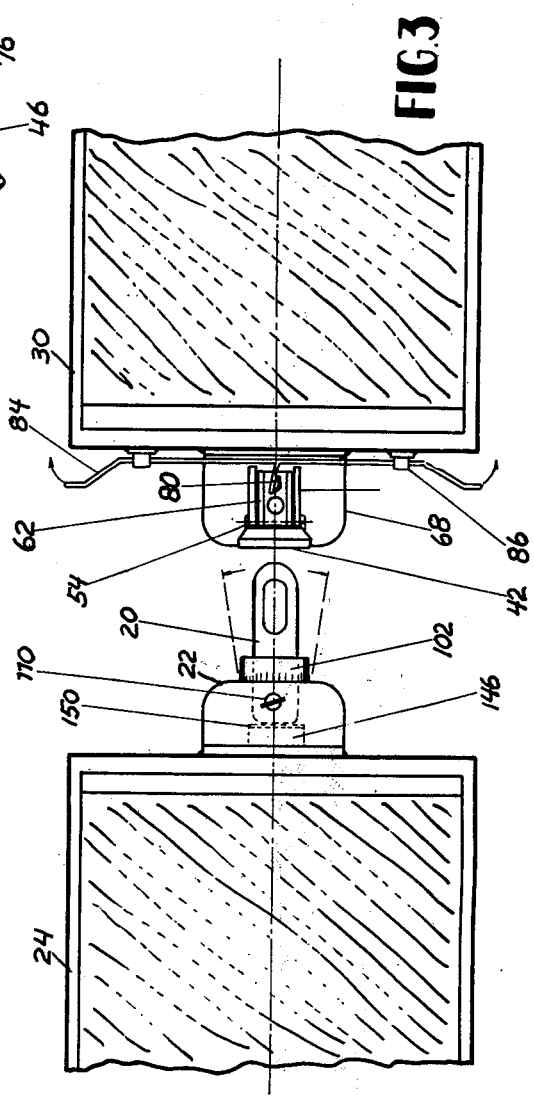

CAR COUPLING

BACKGROUND OF THE INVENTION

1. Field of the Invention

The present invention relates to a mine car coupling device, and more particularly to an automatic pin-type coupling device.

2. Description of the Prior Art

In previous commercial applications mine cars have been connected together through the use of metal pins which are inserted by hand into aligned apertures on the coupling members of adjacent cars. Since the positions of the alignment apertures on the car coupling members are fixed and the alignment between the two apertures must be exact before coupling can be accomplished the cars must be brought into exact relative positions to effect coupling. The pins must be inserted by hand into the aligned apertures, often with great difficulty because of the limited degree of tolerance between the pin and the coupling apertures and also because of slight misalignment of the apertures of the coupling members. The pin must then often be secured in some manner, either by means of a cotter pin or by a chain, so that the pin will not slip out when the coupled cars are set in motion. The resulting coupling is often quite rigid and subject to great stress as a result of relative motion between the cars as the coupled cars are held together during motion of the train of cars. In uncoupling the individual cars, the pins must also be removed by hand, often requiring considerable force if the tolerances are very tight. The force required for removal is increased if the pin has become bent or the coupling members distorted due to great stresses placed on the coupling by relative motion of the cars.

Various automatic mine car coupling devices have utilized an arrow shaped male member on one end of one car and a pivoting spring biased female receiving assembly on one end of an adjacent car. Examples of devices of this type are disclosed in U.S. Pat. Nos. 40,966; 80,735; 142,998; 229,660; 230,458; 425,001; 534,660; 591,927; 599,883; 948,205; 1,610,902; 2,124,467; and 2,248,005.

The present invention differs from the known prior art in that it provides the advantage of automatic coupling with a simple pin-type coupling device. Furthermore, the present invention provides for ease of coupling without critical manual alignment of components or apertures, removes the danger of accidental uncoupling during operation, and allows significant relative motion of the cars without damage to the coupling or pin. The coupling device is of simple and sturdy construction, requiring relatively little maintenance, is highly versatile, reliable, and safe in operation. In addition, cars may be easily uncoupled.

In the Mining Industry there is extensive use of rail operated coal haulage cars to transport coal from conveyor liners to tipple, conveyor to carriers, tipple to storage, and many other hauling operations. Due to limited work areas found in most mines, it is not only very dangerous but against mine safety laws for a man to reach down between the cars to do coupling and uncoupling operations.

Unlike main-line railroad lines, the majority of rail line systems inside most mines are very irregular in grades, curves, uneven track, and varying gauge. These irregularities along with the safety aspect has created a need for an almost fail-safe car coupling that will make engagement easier from varying angles and directions between cars.

The mine car coupling described herein is not only self-centering for use on irregular track but is virtually failsafe and does not require a man to reach down between the cars for coupling or uncoupling.

SUMMARY OF THE INVENTION

The present invention comprises a coupling pin assembly pivotally mounted so that a pin is automatically engaged into the aperture of an elongated ring shaped receiving member or tongue. The coupling pin assembly is mounted on a housing attached to one end of a mine car. The housing has sloped front guide surfaces and curved inner side walls that align the coupling receiving member or tongue in both horizontal and vertical orientation so that the coupling pin will be affirmatively engaged in position. The pin rests in a normal vertical position, extending through apertures in the top and bottom of the housing. The front edge of the pin contacts the forward edges of the two apertures. The forward edge of the elongated ring-shaped receiving member, as it advances into the alignment housing, pushes the pin backwards and upward, i.e., pivoting the pin about a fixed point, so that the pin rides up over the leading tip of the elongated ring-shaped receiving member or tongue. As the receiving member advances further, the pin drops through the aperture in the receiving member, falling back to its normal vertical position locking or coupling the two cars together. When the cars are in motion, the front wall surface of the aperture of the torque is in contact with the front surface of the engaged pin. Similarly the rear surface of the pin is in contact with the rear surfaces of the housing apertures so the pin cannot accidentally become disengaged. If the three apertures are coincidentally aligned so that clearance exists for the pin to be rotated out of the coupling position, the force of gravity prevents the pin assembly from raising up consequently preventing the cars from uncoupling. The pin can be withdrawn by manual operation of the disengagement mechanism. When the three apertures are axially aligned for clearance a lifting bar operated by a handle is used to lift the pin assembly in a disengage position. In addition, the pin assembly can be locked and held in this disengaged position.

The coupling receiving member or tongue member, secured to the other car, is limited in positional variation by a vertical pin on the car. This pin is mounted in a housing which is in turn mounted to one end of the mine car. The mounting assembly holds the receiving member in a normal straight ahead and level position, but permits horizontal rotation about the pivot pin and vertical rotation through the use of a compressible rubber spring. The mounting assembly will return the coupling receiving member to its normal equilibrium position if it should no longer be subject to any deflecting forces. This permitted freedom of motion of the coupling member facilitates the automatic alignment and coupling procedure, and further provides a high reliability and safety factor to the coupling during operation. Because of this allowable range of motion, the coupling will not be subject to great stress during operation that would ordinarily damage the coupling and perhaps result in the failure of the coupling during operation.

Thus the advantages of the present invention over the known prior art are that it combines the simplicity of a pin coupling device with the feature of automatic coupling. The design is rugged, simple and dependable to use, and easy and inexpensive to build since it incorporates simple mechanical elements. The coupling is highly versatile in operation, is not subject to accidental uncoupling, and has a very low risk of mechanical failure during operation. Additionally, due to the novel construction of the coupling mechanism, mine cars can be easily coupled or uncoupled in spite of the differences present in relative heights or lateral displacements of the mine cars.

Although the invention will be set forth in the claims, the invention itself and the manner in which it may be made and used, may be better understood by referring to the following description taken in connection with the accompanying drawings forming a part thereof in which like references numerals refer to like parts throughout the several views and in which:

BRIEF DESCRIPTION OF THE DRAWINGS

FIG. 2 is a side elevation view in section, of the coupling mechanism and coupling alignment assembly of one car, and the coupling receiving assembly of the other car, with the position just before coupling shown in phantom; and FIG. 3 is a partial top plan view, of one end of a mine car with the coupling and alignment assembly, and the opposite end of an adjacent car with the receiving assembly.

DETAILED DESCRIPTION OF THE INVENTION

Figure 1:
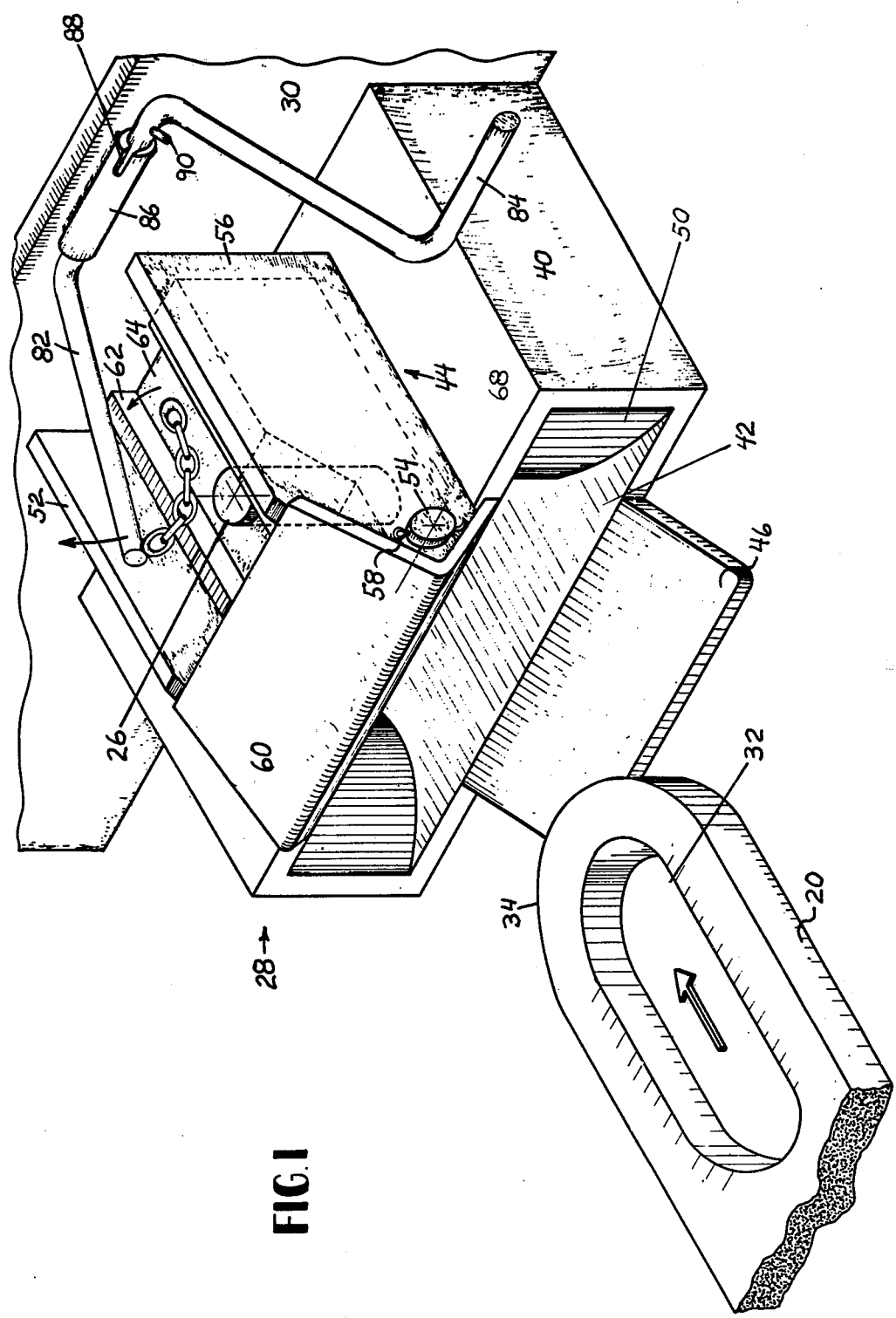
FIG. 1 is a perspective view, partially in section, of the coupling mechanism and coupling alignment assembly mounted on one car and the receiving or tongue member of the other car.

The present invention is shown in general in FIG. 1, and the preferred embodiment of the invention is disclosed in FIGS. 2 and 3. In the preferred embodiment, as shown in FIGS. 2 and 3, the receiving member or tongue 20 of the receiving assembly 22 of the car 24 is coupled by a coupling pin 26 of the alignment and coupling assembly 28 of the adjacent car 30.

The coupling receiving member on tongue 20 has an oval aperture or slot 32 which receives the coupling pin 26. A semicircular front tip 34 of the tongue 20 facilitates alignment with the coupling mechanism. The tip 34 has beveled top and bottom surfaces 36 and 38 respectively to further facilitate and guide coupling as is seen in FIG. 2.

As best seen in FIGS. 1 and 2 the alignment and coupling assembly 28 comprises a housing 40 which defines a cavity 42 to receive and properly align the coupling receiving member or tongue 20. The coupling mechanism 44 allows engagement and disengagement of the coupling pin 26 from the oval slot 32 of the tongue 20. Extending from the housing 40 are front guide plates 46 and 48 extending forward from the open cavity 42 to deflect the receiving member or tongue 20 either up or down so that the tongue will enter the cavity 42 if it is not quite at the proper vertical level for unobstructed entrance. Housing 40 has inner curved sidewalls 50 which define the vertical sides of the cavity 42 and which are curved at the opening of the cavity. Consequently, the curved walls 50 funnel the receiving element or tongue 20 into cavity 42 so that the oval slot 32 and pin 26 are properly aligned.

The coupling mechanism 44 includes the coupling pin 26 mounted on pin housing weldment 52 which pivots about pivot bar 54 to raise and lower the coupling pin 26. The pin housing weldment 52 is rotatably mounted to pivot bar 54 which is in turn mounted in stationery housing side walls 56. Side walls 56 are mounted on top of housing 40. Pivot bar 54 is held in side walls 56 by cotter pin 58 which allows the bar to rotate but not to slip out of position. Sloped surface 60, which is a backward extension of front guide plate surface 48 protects the pin housing weldment 52 from possible damage due to a coupling member 20 that is positioned too high by deflecting it over the pin housing weldment, and also serves as a stop to limit the rotation of the coupling assembly so that it cannot be accidentally rotated so far that it ends up in an inoperative position.

The pin housing weldment 52, as shown in FIG. 2, is comprised of vertical side walls 62 and a top plate 64 which fixedly holds the pin 26. In the preferred embodiment pin supports 63 and 65 are provided which serve to hold the pin perpendicular to the top plate 64. The pivot bar 54 passes through the side walls 56 and allows the pin housing weldment to rotate. Normally, the coupling mechanism sits on the top plate 68 of housing 40 with the pin 26 extending down through the upper aperture 70 of the top plate 68 and the lower aperture 72 in bottom plate 74 of housing 40. The pin rests against the front of apertures 70 and 72 and also against retaining lip 76 which is mounted beneath the bottom plate 74. The rear edge of lip 76 is in vertical alignment with the front of lower aperture 72. The rear of the bottom surface of pin 26 forms a beveled surface 78, so that the pin 26 will clear the apertures 72 and 70 when the pin support assembly is rotated and the pin 26 enters or is withdrawn from the housing.

In FIG. 1 chain 80 is attached on one end to plate 64 and on the other end to lifting rod 82, so that the pin housing weldment 52 can be raised and pivoted by a rotating lifting bar 82. In the preferred embodiment one end of chain 80 is connected to pin support 63. The lifting rod 82 has a handle 84 which serves to rotate the rod upwards and lift the pin housing weldment 52. Rod 82 is rotatably mounted in cylindrical sleeve 86, which is mounted to the mining car 30 above the coupling housing 40. Sleeve 86 is formed with a slot 88 so that rod 82 can be locked in the upward position by engaging a pin 90 secured to and extending from the rod 82 into the slot 88. This locked position keeps coupling pin 26 in an inoperative position outside coupling housing 40. The entire coupling assembly 28 is welded to the mine car frame by the housing rear mounting plate 140.

The receiving or tongue assembly 22 is contained in housing 92 which is mounted to car 24. The receiving or tongue assembly 22 allows rotational displacement of tongue member 20 in both the horizontal and vertical directions. The housing 92 comprises a top member 94, a bottom member 96, and back wall member 98 secured to the top and bottom members. The tongue member 20 is mounted in tongue assembly 22, which is made of upper support 102 and lower support 104. The tongue member 20 is vertically pivotable about pin 110 yet normally held in a level position by a rubber spring 142 which is compressible by push plate 144 to allow it to compensate for varying heights between adjacent mining cars. The tongue can be deflected up or down by irregular track, but when unrestricted, the push plate 144 pushing against the front wall of the rear slot 33 will cause the tongue to seek the equilibrium position which is horizontal in reference to the track grade.

In order to keep the tongue centered in reference to the center-line of the track and cars as shown in FIG. 3, a compressible rubber spring 146 pushes the push plate 150 against a rear flat end surface 152 of the tongue. In the process of negotiating a sharp curve, the tongue 20 may be deflected to the side engaging the push plate 150 and camming it against the rubber spring and compressing the rubber spring 146. When the tongue is not restricted, the expansion of the rubber spring will return the tongue to the equilibrium position as shown in FIG. 3. The tongue assembly 22 is held in rotatable position in the housing 92 by a pin 110 which passes through holes in the housing members 94 and 96 and through aligned holes in assembly 22. The pin 110 is held in position by its head 170 at the top and by cotter pin 114 at the bottom. The pin 110 permits the assembly 122 to rotate about its vertical and horizontal axis.

When forces are applied to coupling member 20, plate structures 150 and 144 can be displaced both horizontally and vertically so that coupling member 20 can rotate in either a horizontal or vertical direction. Both these assembly structures have spring-like properties so that the coupling tongue 20 returns to its normal equilibrium position when the forces are no longer acting on it. These structures permit ease in aligning the receiving or tongue coupling with the coupling assembly of the other car, and also allows for movement of the coupled cars over bumpy or curved sections of track without subjecting the coupling to stresses that would otherwise damage the coupling.

When the mine cars are set in motion a pulling force is created by the pin 26 acting upon the oval slot 32 of the tongue piece. During this pulling action, all forces are transferred from the tongue assembly 22 to the pin 110 which transmits these forces to the car frame welded to the top and bottom members 94 and 96. Rubber spring 146 is captured by the rear bent plate 98. The rubber spring 142 is captured by bent plate 152 which is welded to bent plate 154 riding against pin 110. The rubber spring 142 is enclosed by a centering rectangular tube 156 comprised of the upper support 102 and lower support 104.

Round rods 160 are welded on each side of the tongue and allows the tongue to pivot and yet still remain centered inside bent plate 156.

At the start of operation, the coupling pin 26 is in its lowered vertical position. Car 24 is moved toward car 30 and the receiving or tongue member 20 enters into the cavity 42, guided by the guide surfaces plates 46 and 48 and the curved inner walls 50, to provide the necessary alignment. When the semicircular tip 34 encounters pin 26, it pushes pin 26 backwards and upwards as coupling member 20 proceeds further into the cavity. As contact force is applied to pin 26, pin support housing weldment 52 rotates upward about pivot bar 54, allowing the pin 26 to ride up over the advancing coupling receiving member 20. The position just before coupling is shown in phantom in FIG. 2. When the coupling member 20 continues to advance, the pin 26 moves over the tip 34 upper surface and drops back down through the slot 32 of receiving tongue member 20. The slot 32 is at this point properly aligned with the apertures 70 and 72 permitting pin 26 to fall back to its normal vertical position. The two cars are now coupled. The cars are uncoupled by using the lifting rod 82 to withdraw the pin 26. Accidental uncoupling cannot occur. Further, while the cars are coupled, the couplings are not subject to damage because of the vertical motion of member 20 permitted by the height of cavity 42 and the horizontal motion permitted by the greater width of the slot 32 over the diameter of the pin 26. Finally, if these limits should be reached, then the ability of the receiving assembly 22 to permit further motion of the coupling member 20 should still prevent damage from occurring to the coupling. Thus the coupling is very reliable and fail-proof, either from accidental uncoupling or failure under stress.

While the preferred embodiment of the invention has been disclosed, it is understood that the invention is not limited to such an embodiment since it may be otherwise embodied in the scope of the appended claims.

What is claimed is:

1. A mine car coupling apparatus comprising a coupling pin support housing mounted to a first mine car, said coupling pin housing defining two aligned apertures, a coupling pin assembly pivotally mounted on said coupling pin housing with a coupling pin extending through both of said coupling pin support housing apertures, said coupling pin support housing being provided with upper and lower guide surfaces and inner curved side walls to facilitate coupling, a pin receiving assembly mounted pivotally to a second mine car, said pin receiving assembly comprising a torque means defining an elongated receiver hole, said pin receiving assembly being adapted to engage and pivot said coupling pin through at least one of said apertures and subsequently allow said coupling pin to be dropped into said elongated receiver hole, at least one of said apertures being provided with a retaining lip which serves to take the stress of movement of said mine cars off of said coupling pin.

2. A mine car coupling apparatus as claimed in claim 1 wherein the coupling pin is capable of being rotated and held in an open position by remote uncoupling means, said remote uncoupling means comprising a handle proximal to the side of each of said mine cars carrying said coupling pin support housing, said handle being rotatably mounted in a sleeve, said sleeve being secured to said first mine car and provided with a slot, said handle having a pin and being connected to said coupling pin support housing by connecting means, said remote uncoupling means being capable of locking said coupling means in an open position when said pin is held within the slot of said sleeve.

3. A mine car coupling apparatus as claimed in claim 1 wherein said pin receiving assembly is held by a positioning means which is comprised of spring assemblies which constantly urge said pin receiving assembly into an equilibrium position when said pin receiving assembly is cammed out of said equilibrium position.

4. A mine car coupling apparatus as claimed in claim 3 wherein said positioning means comprises two rubber spring assemblies and pivot plates which serve to cam said pin receiving means into an equilibrium position after a displacing force is removed.

5. A mine car coupling apparatus as claimed in claim 1 wherein said coupling pin is prevented from occupying an inoperable position by a rotational stop means comprising a rearward extension of an upper guide surface of said pin support housing.

6. A mine car coupling apparatus comprising a housing provided with aligned top and bottom apertures mounted to a mine car, a coupling pin pivotally mounted about a horizontal support mounted to said housing, said housing having upper and lower guide surfaces to facilitate coupling, said coupling pin passing through said top and bottom apertures, a pin receiving assembly pivotally mounted about a vertical second pin, said pin receiving assembly defining an elongated receiver slot for connection to another mine car, coupling pin means adapted to engage and rotate said coupling pin through the bottom aligned aperture and top aligned aperature and subsequently allow said coupling pin to be dropped through said slot in said pin receiving assembly and said apertures thereby effecting coupling.

7. A mine car coupling apparatus as claimed in claim 6 wherein said coupling pin has a beveled edge allowing the bottom of said coupling pin to rotate through the bottom aperture and partially through said top aperture of said housing.

8. A mine car coupling apparatus as claimed in claim 6 including a slot positioning means comprising rubber spring assemblies and adjacently positioned push plates which serve to cam said pin receiving assembly into a predetermined equilibrium horizontal and vertical position.

9. A mine car coupling device as claimed in claim 8 wherein said pin receiving assembly comprises a tongue member with an oval shaped slot of greater length than the diameter of said coupling pin.

10. A mine car coupling apparatus as claimed in claim 6 wherein said coupling pin is prevented from rotating totally through said top aligned aperture by a rotational stop means.

11. A mine car coupling apparatus comprising a housing provided with aligned top and bottom apertures mounted to a mine car, a coupling pin pivotally mounted about a horizontal support mounted to said housing, said coupling pin passing through said top and bottom apertures, a pin receiving assembly pivotally mounted about a second pin, said pin receiving assembly being mounted to another mine car and including a tongue member defining an aperture of greater width than the diameter of said coupling pin adapted to engage and rotate said coupling pin through the bottom aligned aperture and top aligned aperture and subsequently allow said coupling pin to be dropped through said tongue member aperture and said apertures effecting coupling, said tongue member being vertically and horizontally displacable in said pin receiving assembly and mounted in positioning means contained in said assembly, said positioning means comprising spring assemblies and associated push plates adapted to engage said tongue member and return said tongue member to a predetermined position after an external force has been placed on it, said pin receiving assembly comprising a housing, a first spring assembly mounted to said housing adapted to engage said tongue member to limit its rotation, a second spring assembly rotatably mounted to said housing and abutting said tongue member to limit vertical displacement of said tongue member and return said tongue member to a substantially horizontal position in the absence of external forces.

* * * * *

UNITED STATES PATENT OFFICE
CERTIFICATE OF CORRECTION

Patent No. 4,073,507           Dated February 14, 1978

Inventor(s)  Billy Dingess

It is certified that error appears in the above-identified patent and that said Letters Patent are hereby corrected as shown below:

On the Title Page delete:

"[73]   Assignee:   Lester Construction Co.,
                    Hurricane, W. Va.     --.

Signed and Sealed this

Thirtieth Day of May 1978

[SEAL]

Attest:

RUTH C. MASON
Attesting Officer

LUTRELLE F. PARKER
Acting Commissioner of Patents and Trademarks